Patented May 23, 1950

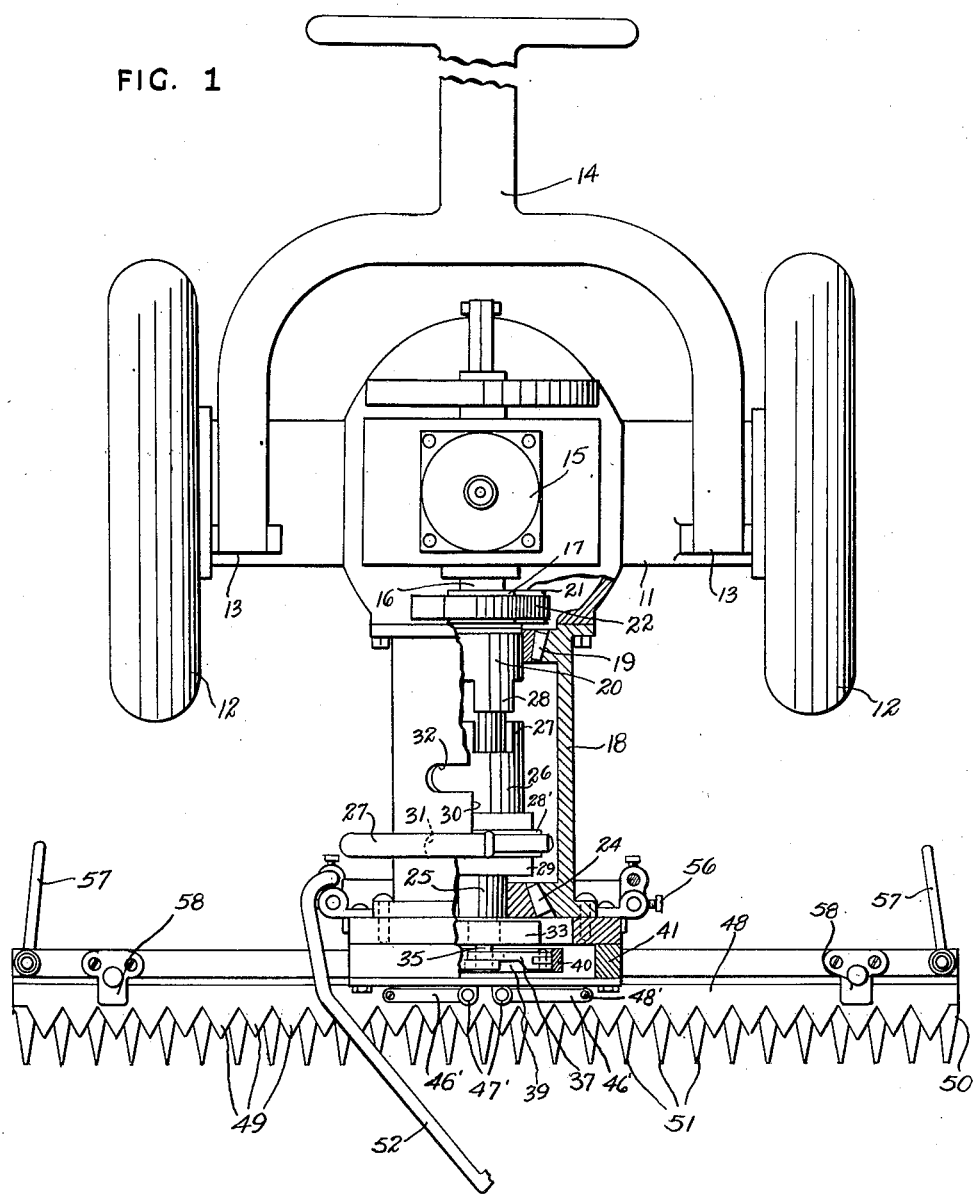

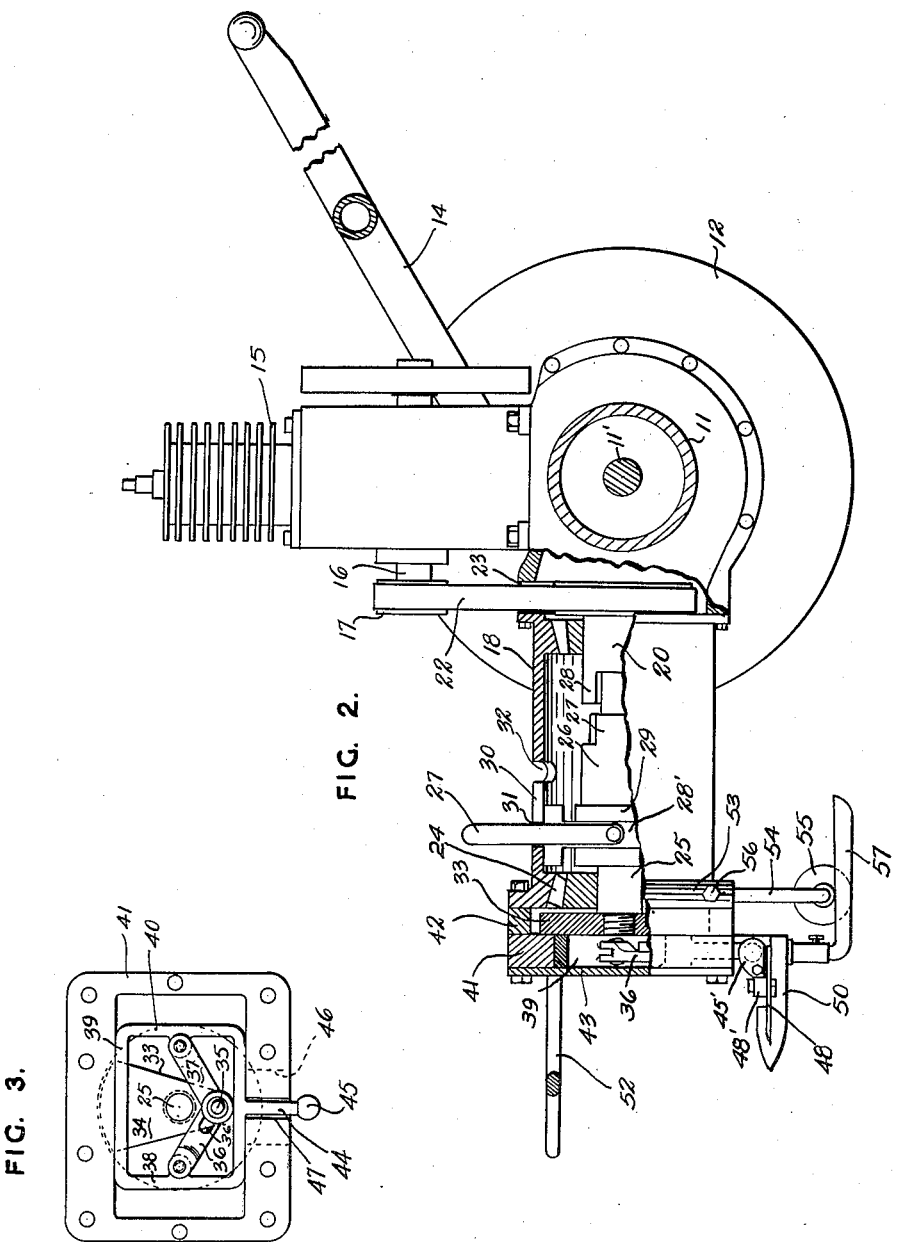

2,508,561

UNITED STATES PATENT OFFICE 2,508,561

LAWN MOWER

Wyatt J. Bayer, Detroit, Mich.

Application May 3, 1946, Serial No. 666,913

4 Claims. (Cl. 56—26.5)

This invention relates to lawn mowers, and more particularly to lawn mowers of the power actuated type.

A main object of the invention is to provide a novel and improved power-actuated lawn mower which is very simple in structure, very easy to operate and very efficient in performance.

A further object of the invention is to provide an improved lawn mower adapted to be readily employed in cutting grass and weeds over large areas and able to reach inaccessible places under hedges and close to buildings, fences and the like, said lawn mower being inexpensive to manufacture and durable in construction.

Further objects and advantages of the invention will become apparent from the following description and claims, and from the accompanying drawings, wherein:

Figure 1 is a top plan view, partly in section, of a lawn mower device constructed in accordance with the present invention.

Figure 2 is a side elevational view, partly in cross-section, of the lawn mower device of Figure 1.

Figure 3 is a detail view in elevation of the cutter actuating mechanism employed in the lawn mower device of Figure 1.

Referring to the drawings, the illustrated lawn mower device comprises a chassis including a transverse axle housing 11 in which is mounted an axle 11' having ground engaging wheels 12, 12 on its opposite ends. Pivotally mounted on the forward side of the axle housing 11 at 13, 13 is a bifurcated handle bar 14 which extends rearwardly from the axle housing 11. Mounted on the axle housing 11 is a conventional prime mover 15, such as a gasoline engine, or the like, provided with a forwardly projecting crankshaft 16 carrying a pulley 17. Secured to chassis 11 and extending forwardly thereof is a generally cylindrical housing 18. Journalled in the rear portion of housing 18 in a roller bearing assembly 19 is a clutch sleeve 20 which is substantially coaxial with housing 18 and formed on its rear end with an integral pulley 21 located substantially in the same transverse vertical plane as pulley 17. A belt 22 drivingly couples pulley 17 to pulley 21, the rear end portion of the top wall of housing 18 being suitably apertured at 23 to provide clearance for the belt.

Journalled in the forward portion of housing 18 by a roller bearing assembly 24 is a shaft 25, coaxial with the housing and turning in sleeve 20. Splined to shaft 25 and longitudinally slidable thereon is a clutch sleeve 26, the adjacent ends of clutch sleeves 20 and 26 being formed with respective cooperating clutch jaws 27 and 28 adapted at times to be interlocked to transmit rotation from sleeve 20 to sleeve 26 and thereby to shaft 25. A conventional clutch shifter mechanism comprising a forked clutch shifter rod 27 secured to a ring member 28' is provided, said ring member 28' being rotatively engaged in a groove 29 formed in sleeve 26. When clutch shifter rod 27 is moved rearwardly the clutch sleeve 26 is moved rearwardly to engage the clutch jaws 27 and 28. A guide slot 20 is formed in the top wall of the housing 18 to guide the movement of the clutch shifter rod, said slot having lateral keeper portions 31 and 32 to maintain the shifter rod in its clutch engaging and disengaging positions, respectively.

Secured intermediate its ends to the forward end of shaft 25 is a sector arm 33. The smaller end of the sector arm 33 carries a pin 35 which is eccentric with respect to the shaft 25. Rotatably and slidably secured to the pin 35 by means of a slot 36', is the inner end of a link 36, the outer end of said link being pivotally secured to the vertical arm 38 of a laterally oscillable rectangular frame 39. Pivotally secured to the pin 35 is the inner end of a link 37, the outer end of which is pivotally secured to a vertical arm 40 of said frame 39. Frame 39 is supported for lateral oscillating movement in a rectangular outer frame 41 which is secured to the forward end of housing 18, with a spacer frame 42 interposed between said outer frame 41 and the forward end of the housing to provide a space in which sector arm 33 rotates.

A front cover plate 43 closes the forward end of outer frame 41, providing a substantially closed housing for the oscillator linkage mechanism.

Oscillator frame 39 is formed with a depending vertical arm 44 terminating at its lower end in a ball 45. A slot 46 is formed in the lower portion of outer frame 41 to provide a space for lateral oscillation of the arm 44, said slot being open at 47 to permit assembly of the parts. When shaft 25 is rotated responsive to engagement of driven clutch sleeve 26 with driving clutch sleeve 20, sector arm 33 rotates and oscillates frame 39 laterally. The wide portion 24 of the sector arm acts to counterbalance the fractional drag of the oscillating mechanism and promotes smooth oscillation thereof.

The ball 45 on the lower end of the arm 44 is pivotally engaged in a socket 45' on a transversely extending cutter bar 48 formed with cutting teeth 49 whereby this cutter bar is oscillated endwise as the shaft 25 is turned. Underlying and slidably supporting the movable cutter bar 48 is a transverse stationary cutter bar 50 rigidly secured to the lower portion of the housing 18 and formed with teeth 51 cooperating with the teeth 49 of the cutter bar 48. Secured to opposite sides of the upper part of the forward end of housing 18 is a generally V-shaped horizontal guard 52. On opposite sides of housing 18 adjacent the forward end thereof but rearwardly of outer frame 41 are vertical sleeves 53 in which are depending rods 54 having ground engaging rollers on their lower ends. Set screws 56 are provided in each sleeve 53 for securing the rods 54 in desired vertically adjusted positions in the sleeves whereby the cutter structure can be supported at the desired level above the ground. The ends of the stationary cutter bar 50 are supported by vertically adjustable skid members 57, 57 which slide along the ground as the lawn mower is pushed forwardly and also act as guards to direct the cut grass away from the uncut grass. Overlying the movable cutter bar 48 are bracket members 58, 58 carried by the stationary cutter bar 50 adjacent the ends thereof and serving to maintain the movable cutter bar 48 in correct alignment with the stationary cutter bar 50.

While a specific embodiment of a lawn mower structure has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A lawn mower comprising a chassis comprising a transverse member having ground engaging wheels at its opposite ends, a horizontal tubular member projecting forwardly from said transverse member, a transversely elongated stationary cutter bar mounted on the forward end of said tubular member, an endwise movable cutter bar cooperatively mounted along said movable cutter bar, ground engaging means on the forward end of said tubular member for supporting said cutter bars relative to the ground, drive means on the forward end of said tubular member operatively connected to said movable cutter bar, a prime mover mounted on said transverse chassis member, a clutch shaft journalled longitudinally in said tubular member and operatively connected to said drive means, said clutch shaft comprising axially engageable clutch elements one of which is operatively connected to said prime mover, and the other non-rotatably mounted on said shaft, means for shifting said other clutch element into and out of engagement with said one clutch element.

2. In a device for converting rotary motion into linear motion, a rotary shaft, a longitudinal pin extending from one end of said shaft eccentrically with respect to the axis of said shaft, a first stationary open frame, a second open frame surrounding said shaft and slidably confined in said first frame for endwise movement transversely with respect to said shaft, links pivoted at one end to opposite sides of said second frame, one of said links having its opposite end slidably pivoted on said pin, the other of said links having its opposite end pivoted to said pin.

3. In combination, a support having longitudinally spaced ends, a shaft journalled on and extending between said ends, said shaft having thereon a splined clutch element and a freely revoluble clutch element, means for moving said splined clutch element into and out of operative engagement along said shaft with said revoluble clutch element, a transversely oscillable member mounted on one end of said support, drive means operatively connecting said shaft with said transversely oscillable member.

4. In combination, a support having longitudinally spaced ends, a shaft journalled on and extending between said ends, said shaft having thereon a splined clutch element and a freely revoluble clutch element, means for moving said splined clutch element onto and out of operative engagement along said shaft with said revoluble clutch element, a transversely oscillable member mounted on one end of said support, drive means operatively connecting said shaft with said transversely oscillable member, said drive means comprising a first frame on said one support end, a second open frame supported for endwise movement in said first frame and surrounding said shaft, an eccentric pin on said shaft, and links each having one end pivoted to opposite sides of said second frame, one of said links having its opposite end slidably pivoted on said pin, the other of said links having its opposite end pivoted to said pin.

WYATT J. BAYER.

REFERENCES CITED

The following references are of record in the file of this patent:

UNITED STATES PATENTS

| Number | Name | Date |
|---|---|---|
| 1,876,662 | Gravely | Sept. 13, 1932 |
| 2,099,481 | Hildyard | Nov. 16, 1937 |
| 2,161,357 | Kaplan | June 6, 1939 |

FOREIGN PATENTS

| Number | Country | Date |
|---|---|---|
| 206,638 | Switzerland | Dec. 1, 1939 |